United States Patent Office 3,074,903
Patented Jan. 22, 1963

3,074,903
LAMINATES
John K. Fincke and Louis M. Higashi, San Jose, Calif., and Reino A. Jarvi, Renton, Wash., assignors to Monsanto Chemical Company, St. Louis, Mo., a corporation of Delaware
No Drawing. Filed June 16, 1959, Ser. No. 820,582
2 Claims. (Cl. 260—43)

This invention relates to laminated structures having good resistance to elevated temperatures and to methods for preparing same. The invention further relates to novel resins to be employed in the manufacture of such laminated structures.

There is growing interest in employing thermoset resin-bonded, fiber-reinforced laminates in applications where high strength and resistance to degradation at high temperatures are required. Typical of the applications in which such laminates are employed are structural members of high speed aircraft, nose cones of ballistic missiles, etc. While considerable know-how has been developed as to methods for preparing such laminates so that they will retain a high percentage of their strength after long exposure to high temperatures, there is a pressing need for laminates which have still better resistance to prolonged exposures at high temperatures.

It is an object of this invention to provide thermoset resin-bonded, fiber-reinforced laminates having a high degree of resistance to degradation at elevated temperatures. Another object of this invention is to provide novel termosetting resins which can be employed in preparing thermoset resin-bonded, fiber-reinforced laminates.

Other objects and advantages of this invention will be apparent from the following detailed description thereof.

The above and related objects are attained by impregnating a reinforcing web with a co-condensation product of a particular methoxysilicone compound and a particular phenolformaldehyde resin and curing the adsorbed resin to a thermoset condition at an elevated temperature.

The following examples are set forth to illustrate more clearly the principle and practice of this invention to those skilled in the art. Where parts or quantities are mentioned, they are parts or quantities by weight unless otherwise specified.

EXAMPLE I

Part A

[Preparation of phenol-formaldehyde resin]

A mixture of 100 parts (1.06 mol) of phenol, 36 parts (1.09 mol) of 91% paraformaldehyde and 2 parts of hexamethylene tetramine are charged to a stirred autoclave equipped with a reflux condenser. The temperature of the reaction mixture is raised from about 20° C. to 50° C. over a period of 30 minutes. At about 50° C. a vigorous exothermic reaction sets in and the pressure in the autoclave is reduced to the pressure at which the reaction mixture refluxes at 85° C. The reaction mixture is maintained under vacuum reflux at 85° C. for 90 minutes, at which time the concentration of unreacted formaldehyde is reduced to about 3%. The pressure in the autoclave is then reduced so that the boiling point of the reaction mixture falls to 45° C. Approximately 5 parts of distillate are recovered during this cooling operation. The resin solution is then dehydrated by adding 17 parts of anhydrous isopropanol to the autoclave and vacuum distilling the isopropanol under a pressure of about 25 mm. of Hg until the distillate temperature rises to about 70° C. A total of 8 parts of distillate are collected in this step.

Part B

[Preparation of co-condensation product]

To the reaction mixture of Part A above are added 26 parts (0.06 mol) of a commercially available methoxypolysiloxane having an average molecular weight of about 470 and a methoxy content of about 20%. The resulting mixture is heated to an initial reflux temperature of about 70° C. under a pressure of about 25 mm. of Hg and take off of the distillate is begun. The distillation is continued at a constant pressure of 25 mm. of Hg until the distillate temperature increases to about 75° C. In all, 2.5 parts of distillate are recovered. This distillate consists predominantly of methanol. The reaction mixture is cooled and sufficient anhydrous isopropanol is added thereto to provide a solution containing 60% resin solids.

The methoxypolysiloxane employed in the paragraph above is prepared by reacting 2 molar portions of methylphenyldimethoxysilane and 1 molar portion of phenyltrimethoxysilane with 2 molar portions of water. Its average chemical composition can be represented by the following formula:

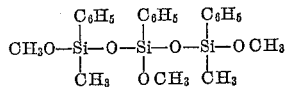

EXAMPLE II

Part A

Sheets of woven glass cloth (E.C.D.–225–181 finished with gamma-aminopropyltriethoxysilane) are impregnated with resin by dipping the cloth in the resin solution prepared in Example I, Part B and removing the excess resin solution by drawing the cloth over a scraper bar. The impregnated cloth is heated in an oven for 2 hours at 190° F. to remove the solvent from the impregnated cloth and to partially advance the resin. The resulting cloth contains about 40% resin solids and about 2% of volatiles.

Part B

A series of laminates ⅛" thick are prepared from sheets of resin impregnated cloth prepared as described in Part A. Fourteen plies of cloth are laid up with the warp running in the same direction in all plies and the assembly is pressed under a pressure of about 200 p.s.i. at a temperature of 250° F. for 1 hour. After being removed from the mold, the laminate is post-cured by being heated for 24 hours at 300° F., 24 hours at 350° F., 8 hours at 400° F., 4 hours at 450° F., and 48 hours at 500° F.

Part C

The laminates prepared in Part B above are maintained in an air-circulating oven for, respectively, 100 hours and 200 hours at 600° F. The flexural strengths of the laminates are then determined at 600° F. employing Federal Specification L–P–406 Test Method No. 1031 and the values are reported in Table I below.

TABLE I

| Hours aged @ 600° F.: | Flexural strength p.s.i. |
|---|---|
| 100 | 30,000 |
| 200 | 23,000 |

Part D

For purposes of comparison, laminates identical to those of Part B are prepared except that the sheets of glass cloth are impregnated and bonded with the phenol-formaldehyde resin prepared in Example I, Part A. These laminates, after 100 hours and 200 hours aging at 600°

F., have the following flexural strengths (measured as described in Part C):

TABLE II

| Hours aged @ 600° F.: | Flexural strength, p.s.i. |
|---|---|
| 100 | 11,000 |
| 200 | 2,000 |

It is seen that the laminates of Part C that are bonded with the novel co-condensation products of this invention have greater resistance to degradation at elevated temperatures than do the laminates of Part D that are bonded with a phenol formaldehyde resin.

EXAMPLE III

Part A

A phenol-formaldehyde resin is prepared in exactly the same manner as described ni Example I, Part A.

Part B

A co-condensate of the phenol-formaldehyde resin of Part A above and phenyltrimethoxysilane is prepared as described in Example I, Part B except that 12 parts of the phenyltrimethoxysilane are employed in lieu of the 26 parts of methoxypolysiloxane employed in Example I, Part B.

EXAMPLE IV

Part A

Sheets of woven glass cloth (E.C.D.–225–118 finished with gamma-aminopropyltriethoxysilane) are impregnated with the resin of Example III, Part B, and heated for two hours at 190° F. to remove the solvent from the impregnated cloth and to partially advance the resin. The resulting cloth contains about 40% resin solids and about 2% of volatiles.

Part B

A laminate 1/8" thick is prepared from 14 sheets of resin impregnated cloth prepared as described in Part A above. The pressing conditions employed are identical with those set forth in Example II, Part B.

The laminate prepared above is maintained in an air-circulating oven for 100 hours at 600° F. The flexural strength of the laminate (measured as described in Example II, Part C) after this treatment is 36,000 p.s.i.

The laminates of the present invention are prepared by impregnating a reinforcing web with a novel co-condensation product of a particular methoxysilicone compound and a particular phenol-formaldehyde resin, subjecting the resin-impregnated reinforcing web to pressure and curing the resin at an elevated temperature.

The reinforcing webs employed herein may be cloths, batts or rovings of glass fibers, metal filaments, asbestos, polyacrylonitrile filaments, nylon filaments, or filaments of similar high melting materials. As is known, the reinforcing web shoud be treated with a suitable finishing agent to obtain good adhesion between the reinforcing web and the resin. Scores of suitable finishing agents are known in the art and are exemplified by such materials as gamma-aminopropyltriethoxysilane and Werner type compounds formed between chromium compounds and methacrylic acid as represented by the Volan bonding agents supplied by the E. I. du Pont Company.

In preparing the laminates the reinforcing web is impregnated with a solution of the resin and heated at low temperatures, e.g., not substantially above about 200° F., to advance the resin and to reduce the volatiles content of the impregnated web to the order of 2–8%, depending primarily upon the pressing conditions that are to be subsequently employed. In most cases it is desirable to impregnate the web so that it contains about 30–50% and more especially about 35–45% of resin solids. Thereafter, a plurality of plies of the resin impregnated webs are laid up and pressed for about 30–60 minutes at an elevated temperature e.g., 250–400° F., to bond the plies and cure the resin. Thereafter, it is preferred practice to post-cure the laminate by heating it for a period of at least about 15 hours at a temperature of about 250–600° F. Usually the temperature will be slowly increased during the post-curing step from an initial temperature of at least 250° F. to a final temperature of at least 500° F.

When the laminates are to be molded at low pressures of the order of about 14 p.s.i., as by the popular vacuum bag molding method, the plies of the resin impregnated web should contain about 35–40% resin solids and have a volatiles content of 4–8%. A typical pressing cycle is as follows:

10 minutes at 275° F.
20 minutes at 325° F.
30 minutes at 350° F.

To obtain optimum heat resistant properties the laminates should be post-cured in accordance with the following schedule:

8 hours at 350° F.
8 hours at 375° F.
4 hours at 400° F.
2 hours at 450° F.
1 hour at 500° F.
1 hour at 600° F.

When the laminates are to be molded at higher pressures, e.g., at a pressure of the order of 200 p.s.i., the plies of the reinforcing web should contain about 40–45% resin solids and have a volatiles content of about 2.5–4.5%. The laminates can be cured by pressing for about 60 minutes at 250° F. To obtain optimum heat resistant properties the laminates should be post-cured in accordance with the following schedule:

24 hours at 300° F.
24 hours at 350° F.
8 hours at 400° F.
4 hours at 450° F.
48 hours at 500° F.

The heat resistant properties of the laminates can be further improved by coating the laminates with the co-condensation product of the methoxysilicone compound and the phenol-formaldehyde resin before the laminates are post-cured. In this embodiment of the invention, a laminate is prepared as described above and the surface of the laminate is then impregnated with the co-condensation product of the methoxysilicone compound and the phenol-formaldehyde resin by any suitable means such as roll-coating, brushing, spraying, etc. In general, however, it is preferred to dip the laminate in the resin solution for a period of at least 2 and preferably at least 5 minutes to insure maximum penetration of the resin into the laminate. The adsorbed resin is then cured to a thermoset condition at an elevated temperature, e.g., by heating for 2–12 hours at a temperature of about 180–210° F. The laminate is then post-cured in accordance with one of the heating schedules set forth earlier herein.

The resins employed in the invention are co-condensation products of about 5–20% and preferably about 10–15% of a particular methoxysilicon compound and, correspondingly, about 95–80% and preferably about 90–85% of a particular phenolformaldehyde resin. The co-condensation products are prepared by heating a substantially anhydrous mixture of the two resin moieties to reflux temperature and removing the methanol that is liberated in the reaction. It is preferred to run the co-condensation reaction under reduced pressure, e.g., less than about 100 and more especially less than 50 mm. of Hg. After being prepared, the co-condensation products are preferably diluted to 40–70% resin solids with an anhydrous low boiling acyclic alcohol containing 1–4 carbon atoms, e.g., ethanol, n-propanol, isopropanol, ethylene glycol, or the like.

The methoxysilicone compound moiety of the co-condensation product can be either a methoxysilane or a methoxypolysiloxane. The methoxysilanes that can be employed conform to the following formula:

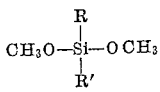

where R is an aryl group and R' is a methoxy group, an aryl group or an alkyl group containing up to 4 carbon atoms. Typical examples of such methoxysilanes include diphenyldimethoxysilane, ditolyldimethoxysilane, phenylmethyldimethoxysilane or preferably phenyltrimethoxysilane. The methoxypolysiloxanes that can be employed conform to the formula:

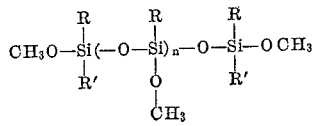

where R is an aryl group, R' is a methoxy group, an aryl group or an alkyl group containing up to 4 carbon atoms, and $n$ has a value of 0, 1 or 2. In lieu of a single methoxysilicone compound it is feasible to employ mixtures of two or more methoxysilanes, mixtures of two or more methoxypolysiloxanes or mixtures of at least one methoxysilane with at least one methoxypolysiloxane. Both the methoxysilanes and the methoxypolysiloxanes are commercially available compounds whose methods of preparation are well known in the art and, accordingly, not set forth herein.

The phenol-formaldehyde resin moiety of the co-condensation product is prepared by reacting 1 mol of phenol with 1.02–1.12 mols of paraformaldehyde in the presence of a catalytic quantity of hexamethylene tetramine, e.g., 1–4 parts of hexamethylene tetramine per 100 parts of phenol. The polymerization is carried to the point where the resin contains less than about 3% unreacted formaldehyde and has a stroke cure time in the range of 150–350 seconds. After being prepared, any water remaining in the resin should be removed by azeotropic distillation with a low boiling acyclic alcohol containing 1–4 carbon atoms. This azeotropic distillation should be carried out at a reduced pressure, e.g., 100 mm. of Hg or less.

The stroke cure time mentioned in the paragraph above is determined in accordance with the following test procedure. Place 0.26 ml. of the resin solution on a hot plate maintained at 150° C. and immediately spread it uniformly over an area of the hot plate about 1½″ on a side with a spatula. Continue stroking the resin with the spatula at the rate of about 1 stroke per second, always using the same side of the spatula and in such a manner that the resin used finally covers an approximate square area of the hot plate about 2″ on a side. When the resin no longer stocks to the spatula, turn the spatula once and continue stroking the resin with the clean edge. The end point is taken as the point at which the resin film has lost enough plasticity so that it is no longer possible to erase the marks made by the scraping action of the spatula. The time elapsed from first placing the resin on the hot plate to this point is considered as the stroke cure time.

The laminates of the invention can be employed as structural members and particularly as structural members in high speed aircraft, nose cones of ballistic missiles, etc. and in other applications which requires laminates that retain a high percentage of their strength after long exposures to high temperatures.

The above descriptions and particularly the examples are set forth for purposes of illustration only. Many other variations and modifications thereof will be apparent to those skilled in the art and can be made without departing from the spirit and scope of the invention herein described.

What is claimed is:

1. A method for preparing a co-condensation product which consists essentially of heating a substantially anhydrous mixture of about 5–20% of a methoxysilicone compound and, correspondingly, about 95–80% of a phenol-formaldehyde resin to reflux temperature and removing the methanol liberated in the reaction; said methoxysilicone compound being selected from the group consisting of (a) at least one methoxysilane of the formula:

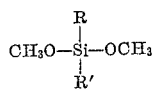

where R is an aryl group and R' is selected from the group consisting of a methoxy group, an aryl group, and an alkyl group containing up to 4 carbon atoms, (b) at least one methoxypolysiloxane of the formula:

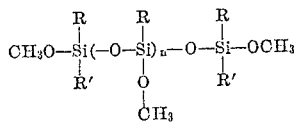

where R is an aryl group, R' is selected from the group consisting of a methoxy group, an aryl group and an alkyl group containing up to 4 carbon atoms and $n$ is an integer having a value of 0–2, and (c) mixtures of (a) and (b); said phenol-formaldehyde resin having been prepared by reacting 1 mol of phenol with 1.02–1.12 mol of paraformaldehyde in the presence of a catalytic quantity of hexamethylene tetramine.

2. A heat reaction product of about 5–20% of a methoxysilicone compound and, correspondingly, about 95–80% of a phenol-formaldehyde resin; said methoxysilicone compound being selected from the group consisting of (a) at least one methoxysilane of the formula:

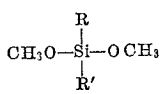

where R is an aryl group and R' is selected from the group consisting of a methoxy group, an aryl group, and an alkyl group containing up to 4 carbon atoms, (b) at least one methoxypolysiloxane of the formula:

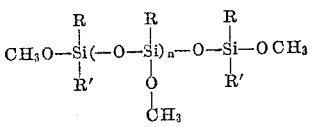

where R is an aryl group, R' is selected from the group consisting of a methoxy group, an aryl group and an alkyl group containing up to 4 carbon atoms and $n$ is an integer having a value of 0–2, and (c) mixtures of (a) and (b); said phenol-formaldehyde resin having been prepared by reacting 1 mol of phenol with 1.02–1.12 mol of paraformaldehyde in the presence of a catalytic quantity of hexamethylene tetramine.

References Cited in the file of this patent
UNITED STATES PATENTS

| | | |
|---|---|---|
| 2,755,269 | Moorhead | July 17, 1956 |
| 2,810,674 | Madden | Oct. 22, 1957 |
| 2,927,910 | Cooper | Mar. 8, 1960 |